US012113434B2

(12) United States Patent
Liu

(10) Patent No.: US 12,113,434 B2
(45) Date of Patent: Oct. 8, 2024

(54) POWER SUPPLY APPARATUS AND DISCHARGE METHOD THEREOF

(71) Applicant: Power Forest Technology Corporation, Hsinchu County (TW)

(72) Inventor: Chia-Hsien Liu, Chiayi County (TW)

(73) Assignee: Power Forest Technology Corporation, Hsinchu County (TW)

( * ) Notice: Subject to any disclaimer, the term of this patent is extended or adjusted under 35 U.S.C. 154(b) by 827 days.

(21) Appl. No.: 17/308,064

(22) Filed: May 5, 2021

(65) Prior Publication Data

US 2022/0320887 A1 Oct. 6, 2022

(30) Foreign Application Priority Data

Mar. 30, 2021 (TW) .................................. 110111470

(51) Int. Cl.
*H02M 1/32* (2007.01)
*H02J 7/00* (2006.01)
*H02J 7/34* (2006.01)
*H02M 3/335* (2006.01)
*H02M 7/06* (2006.01)

(52) U.S. Cl.
CPC ........... *H02M 1/322* (2021.05); *H02J 7/0048* (2020.01); *H02J 7/007182* (2020.01); *H02M 3/335* (2013.01); *H02J 7/345* (2013.01); *H02M 1/32* (2013.01); *H02M 7/062* (2013.01)

(58) Field of Classification Search
CPC ...... H02M 1/322; H02M 3/335; H02J 7/0048; H02J 7/007182

USPC .......................................................... 320/166
See application file for complete search history.

(56) References Cited

U.S. PATENT DOCUMENTS

| | | | | | |
|---|---|---|---|---|---|
| 5,012,121 | A | * | 4/1991 | Hammond | H02J 9/061 307/64 |
| 5,136,251 | A | * | 8/1992 | George | G01R 27/2605 341/150 |
| 5,488,552 | A | * | 1/1996 | Sakamoto | H02M 3/335 363/16 |
| 5,602,462 | A | * | 2/1997 | Stich | H02J 9/062 307/64 |
| 6,002,221 | A | * | 12/1999 | Ochiai | B60L 3/0023 318/811 |
| 7,422,293 | B2 | * | 9/2008 | Chorian | B60L 50/51 340/436 |
| 7,603,049 | B2 | * | 10/2009 | Kishi | H02J 7/345 399/88 |
| 7,777,461 | B2 | * | 8/2010 | Martin | H02M 3/1584 323/272 |
| 7,852,053 | B2 | * | 12/2010 | Martin | H02M 3/1584 323/272 |

(Continued)

*Primary Examiner* — John T Trischler
(74) *Attorney, Agent, or Firm* — JCIPRNET

(57) ABSTRACT

A power supply apparatus and a discharge method thereof are provided. A control unit detects a cross-voltage across two ends of an AC safety capacitor to generate a detection voltage, compares the detection voltage with a threshold voltage, counts the number of cycles of the detection voltage during a period when the detection voltage does not cross the threshold voltage according to a comparison result between the detection voltage and the threshold voltage, and performs a discharge operation when the number of cycles is greater than or equal to a predetermined value to discharge electric energy stored in the AC safety capacitor.

12 Claims, 8 Drawing Sheets

(56) References Cited

U.S. PATENT DOCUMENTS

| | | | | |
|---|---|---|---|---|
| 7,869,231 B2* | 1/2011 | Cohen | H02M 3/33592 | 363/21.18 |
| 7,923,974 B2* | 4/2011 | Martin | H02M 3/1588 | 323/212 |
| 8,115,457 B2* | 2/2012 | Balakrishnan | H02M 1/32 | 320/166 |
| 8,154,890 B2* | 4/2012 | Yasuda | H02M 1/36 | 363/37 |
| 8,344,712 B2* | 1/2013 | Martin | H02M 3/157 | 323/283 |
| 8,421,431 B2* | 4/2013 | Chia | H03K 3/84 | 327/134 |
| 8,471,626 B2* | 6/2013 | Huang | H02M 1/126 | 323/901 |
| 8,508,960 B2* | 8/2013 | Chen | H02H 1/0007 | 363/21.16 |
| 8,624,562 B2* | 1/2014 | Balakrishnan | H02M 1/32 | 320/166 |
| 8,625,251 B2* | 1/2014 | Urienza | H02M 1/44 | 361/220 |
| 8,710,806 B2* | 4/2014 | Moon | H02M 1/36 | 320/166 |
| 8,725,910 B1* | 5/2014 | Sala | G06F 13/385 | 710/17 |
| 8,953,347 B2* | 2/2015 | Jin | H02M 7/217 | 363/78 |
| 9,036,377 B2* | 5/2015 | Chang | H03K 3/84 | 363/21.18 |
| 9,065,340 B2* | 6/2015 | Balakrishnan | H02M 1/32 | |
| 9,148,049 B2* | 9/2015 | Li | H02M 1/32 | |
| 9,203,295 B2* | 12/2015 | Lee | H02M 1/126 | |
| 9,209,737 B2* | 12/2015 | Funaba | H02M 7/5387 | |
| 9,219,420 B1* | 12/2015 | Zhang | H02M 3/33507 | |
| 9,343,976 B2* | 5/2016 | Chu | H02M 7/06 | |
| 9,374,019 B2* | 6/2016 | Li | H02J 7/0036 | |
| 9,419,511 B2* | 8/2016 | Huang | H02M 1/32 | |
| 9,514,715 B2* | 12/2016 | Hurd | G09G 5/363 | |
| 9,735,665 B2* | 8/2017 | Balakrishnan | H02M 1/32 | |
| 9,778,310 B2* | 10/2017 | Schliebe | G01R 31/72 | |
| 9,897,964 B2* | 2/2018 | Shimura | G03G 15/80 | |
| 9,899,849 B2* | 2/2018 | Li | H02M 7/219 | |
| 10,056,823 B2* | 8/2018 | Tsou | H02M 1/32 | |
| 10,063,073 B2* | 8/2018 | Yao | H02J 7/00308 | |
| 10,090,775 B2* | 10/2018 | Halberstadt | H02M 7/06 | |
| 10,122,478 B2* | 11/2018 | Khater | G01R 23/02 | |
| 10,153,687 B2* | 12/2018 | Balakrishnan | H02M 1/32 | |
| 10,170,975 B1* | 1/2019 | Feng | H02M 5/12 | |
| 10,340,802 B1* | 7/2019 | Ke | H02M 1/34 | |
| 10,345,348 B2* | 7/2019 | Gobbi | G01R 19/04 | |
| 10,374,508 B2* | 8/2019 | Gong | H02M 1/126 | |
| 10,566,809 B2* | 2/2020 | Li | H02M 7/219 | |
| 10,608,525 B2* | 3/2020 | Balakrishnan | H02M 1/32 | |
| 10,615,892 B2* | 4/2020 | Khater | G01R 23/02 | |
| 10,800,360 B2* | 10/2020 | Tsuji | B60R 16/03 | |
| 10,890,606 B2* | 1/2021 | Gobbi | H02J 7/0071 | |
| 10,998,814 B2* | 5/2021 | Yang | H02M 1/36 | |
| 11,183,860 B2* | 11/2021 | Li | H02M 7/219 | |
| 11,228,239 B2* | 1/2022 | Benabdelaziz | H02M 7/217 | |
| 11,485,244 B2* | 11/2022 | Ruano Álvarez | B60L 50/60 | |
| 11,750,010 B2* | 9/2023 | Gobbi | G01R 19/16557 | 320/166 |
| 11,936,288 B2* | 3/2024 | Benabdelaziz | H02M 1/4208 | |
| 11,942,871 B2* | 3/2024 | Ahmed | G06F 13/4282 | |
| 2005/0191078 A1* | 9/2005 | Kishi | H02J 7/345 | 399/88 |
| 2007/0026711 A1* | 2/2007 | Chorian | B60L 3/0053 | 439/174 |
| 2008/0157742 A1* | 7/2008 | Martin | H02M 3/1584 | 323/284 |
| 2008/0157743 A1* | 7/2008 | Martin | H02M 3/1584 | 323/284 |
| 2009/0174262 A1* | 7/2009 | Martin | H02M 3/157 | 307/82 |
| 2010/0027298 A1* | 2/2010 | Cohen | H02M 3/33592 | 363/21.14 |
| 2010/0149844 A1* | 6/2010 | Yasuda | H02M 1/36 | 363/95 |
| 2011/0025278 A1* | 2/2011 | Balakrishnan | H02M 1/32 | 320/166 |
| 2011/0176341 A1* | 7/2011 | Huang | H02M 1/126 | 363/49 |
| 2011/0221408 A1* | 9/2011 | Martin | H02M 3/1588 | 323/272 |
| 2011/0249476 A1* | 10/2011 | Chen | H02H 1/0007 | 363/52 |
| 2011/0285440 A1* | 11/2011 | Chia | H03K 3/84 | 327/172 |
| 2012/0105016 A1* | 5/2012 | Moon | H02M 1/36 | 320/166 |
| 2012/0105018 A1* | 5/2012 | Balakrishnan | H02M 1/32 | 320/166 |
| 2012/0112771 A1* | 5/2012 | Schliebe | G01R 31/52 | 324/686 |
| 2012/0300499 A1* | 11/2012 | Chang | H03K 3/84 | 363/16 |
| 2013/0033236 A1* | 2/2013 | Li | H02J 7/0036 | 327/333 |
| 2013/0044403 A1* | 2/2013 | Urienza | H02M 1/44 | 361/220 |
| 2013/0188405 A1* | 7/2013 | Jin | H02M 7/217 | 363/49 |
| 2013/0242626 A1* | 9/2013 | Li | G02B 9/02 | 307/326 |
| 2013/0335038 A1* | 12/2013 | Lee | H02M 1/126 | 320/166 |
| 2014/0097803 A1* | 4/2014 | Balakrishnan | H02M 1/32 | 320/166 |
| 2014/0152108 A1* | 6/2014 | Takabatake | B60L 50/16 | 307/64 |
| 2014/0191693 A1* | 7/2014 | Funaba | H02P 27/06 | 318/139 |
| 2014/0307486 A1* | 10/2014 | Huang | H02M 3/335 | 363/21.16 |
| 2015/0179146 A1* | 6/2015 | Hurd | G09G 5/363 | 345/501 |
| 2015/0256059 A1* | 9/2015 | Balakrishnan | H02M 1/32 | 320/166 |
| 2015/0288286 A1* | 10/2015 | Chu | H02M 3/33507 | 363/21.12 |
| 2015/0340890 A1* | 11/2015 | Yao | H02M 3/33523 | 320/114 |
| 2016/0117875 A1* | 4/2016 | Duchemin | H03K 17/955 | 340/5.72 |
| 2016/0124029 A1* | 5/2016 | Gobbi | G01R 19/16557 | 320/166 |
| 2016/0226371 A1* | 8/2016 | Tsou | H02M 1/32 | |
| 2016/0268828 A1* | 9/2016 | Mao | H02J 7/02 | |
| 2016/0268919 A1* | 9/2016 | Halberstadt | H02M 1/32 | |
| 2016/0329727 A1* | 11/2016 | Li | H02M 7/219 | |
| 2017/0075289 A1* | 3/2017 | Shimura | G03G 15/2039 | |
| 2017/0187217 A1* | 6/2017 | Gong | H02M 1/126 | |
| 2017/0201335 A1* | 7/2017 | Khater | H01P 1/219 | |
| 2017/0259668 A1* | 9/2017 | Nomura | B60W 10/06 | |
| 2017/0302156 A1* | 10/2017 | Balakrishnan | H02M 1/32 | |
| 2018/0097382 A1* | 4/2018 | Li | H02J 7/0036 | |
| 2018/0358891 A1* | 12/2018 | Diotte | H02M 1/32 | |
| 2019/0061654 A1* | 2/2019 | Tsuji | B60R 16/03 | |
| 2019/0074762 A1* | 3/2019 | Balakrishnan | H02M 1/32 | |
| 2019/0369146 A1* | 12/2019 | Gobbi | G01R 19/16557 | |
| 2019/0393772 A1* | 12/2019 | Diotte | H02M 3/1584 | |
| 2020/0076516 A1* | 3/2020 | Khater | H03H 7/1775 | |
| 2020/0144834 A1* | 5/2020 | Li | H02J 7/0036 | |
| 2020/0274439 A1* | 8/2020 | Yang | H02M 1/36 | |
| 2021/0080491 A1* | 3/2021 | Gobbi | G01R 19/16557 | |
| 2021/0284035 A1* | 9/2021 | Ruano Álvarez | B60L 53/22 | |
| 2021/0336533 A1* | 10/2021 | Benabdelaziz | H02M 7/12 | |
| 2022/0038078 A1* | 2/2022 | Shen | H03K 5/24 | |
| 2022/0103062 A1* | 3/2022 | Benabdelaziz | H02M 7/12 | |

(56) References Cited

U.S. PATENT DOCUMENTS

2022/0200476 A1\* 6/2022 Ahmed ............. H02M 3/33576
2022/0320889 A1\* 10/2022 Ono .................. H02J 7/007184
2024/0048065 A1\* 2/2024 Liu ......................... H02M 7/06

\* cited by examiner

POWER SUPPLY APPARATUS AND DISCHARGE METHOD THEREOF

CROSS-REFERENCE TO RELATED APPLICATION

This application claims the priority benefit of Taiwanese application no. 110111470, filed on Mar. 30, 2021. The entirety of the above-mentioned patent application is hereby incorporated by reference herein and made a part of this specification.

BACKGROUND

Technical Field

The disclosure relates to an electronic device; particularly, the disclosure relates to a power supply apparatus and a discharge method thereof.

Description of Related Art

A power supply apparatus mainly serves to convert the AC input power of a high voltage and low stability provided by the power company into a DC output power of a low voltage and better stability suitable for use by various electronic devices, and provide the DC output power for computers, office automation equipment, industrial control equipment, and communication equipment, among other electronic devices, to use.

Mostly in the conventional power supply apparatuses, an electromagnetic interference filter (EMI filter) is provided in the front-end stage, and possible noise in an AC signal may be filtered out by an AC safety capacitor in the electromagnetic interference filter. To prevent users from the risk of electric shock, it is required to release electric energy stored in the AC safety capacitor when it is detected that the AC power of the power supply apparatus is removed or abnormality occurs therein. The conventional power supply apparatus determines whether to release the electric energy stored in the AC safety capacitor based on whether a sine wave is detected at the input terminal. In this way, although it is possible to determine whether the AC power has been removed, in a case where abnormality occurs in the AC power while the sine wave can still be detected at the input terminal of the power supply apparatus, however, the electric energy release of the AC safety capacitor cannot be performed, causing safety concerns on the power supply apparatus.

SUMMARY

The disclosure provides a power supply apparatus, in which safety of use of the power supply apparatus can be improved.

The power supply apparatus of the disclosure includes a power conversion circuit, an AC safety capacitor, and a control unit. The power conversion circuit receives an AC input voltage through an input side, and converts the AC input voltage into a DC output voltage. The AC safety capacitor is connected across the input side. The control unit is coupled to the power conversion circuit and the AC safety capacitor, and controls operation of the power conversion circuit. The control unit detects a cross-voltage across two ends of the AC safety capacitor to generate a detection voltage, compares the detection voltage with a threshold voltage, counts the number of cycles of the detection voltage during a period when the detection voltage does not cross the threshold voltage according to a comparison result between the detection voltage and the threshold voltage, and performs a discharge operation when the number of cycles is greater than or equal to a predetermined value to discharge electric energy stored in the AC safety capacitor.

In an embodiment of the disclosure, the control unit sets the threshold voltage according to a peak voltage of the detection voltage.

In an embodiment of the disclosure, a peak voltage of the detection voltage and the threshold voltage have a predetermined ratio therebetween, and the control unit sets the threshold voltage according to the peak voltage of the detection voltage and the predetermined ratio.

In an embodiment of the disclosure, the control unit sets the threshold voltage corresponding to an $N+1^{th}$ cycle of the detection voltage according to a peak voltage of an $N^{th}$ cycle of the detection voltage, where N is a positive integer.

In an embodiment of the disclosure, the control unit includes a rectifier circuit, a voltage-dividing circuit, a comparator circuit, and a counter circuit. The rectifier circuit is coupled to the power conversion circuit and the AC safety capacitor, and rectifies the AC input voltage to generate a rectified voltage. The voltage-dividing circuit is coupled to the rectifier circuit, and divides the rectified voltage to generate the detection voltage. Positive and negative input terminals of the comparator circuit respectively receive the threshold voltage and the detection voltage, and the comparator circuit outputs a comparison voltage according to the detection voltage and the threshold voltage. The counter circuit is coupled to an output terminal of the comparator circuit, counts the number of cycles of the detection voltage during the period when the detection voltage does not cross the threshold voltage according to the comparison voltage to generate a count value, and outputs a discharge control signal according to the count value and the predetermined value.

In an embodiment of the disclosure, the control unit includes a discharge circuit under control by a discharge control signal to provide a discharge path between the AC safety capacitor and a ground terminal to discharge the electric energy stored in the AC safety capacitor to the ground terminal.

In an embodiment of the disclosure, the discharge circuit includes a controllable load or a voltage-controlled current source.

In an embodiment of the disclosure, the power conversion circuit includes a choke, a full-bridge rectifier circuit, a filter capacitor, and a voltage conversion circuit. The choke is coupled to the AC safety capacitor, receives the AC input voltage, and is configured to filter power noise in the AC input voltage. The full-bridge rectifier circuit is coupled to the choke, and performs full-bridge rectification on the AC input voltage filtered by the choke to generate an input voltage. The filter capacitor is coupled to the full-bridge rectifier circuit, and is configured to filter the input voltage. The voltage conversion circuit is coupled to the full-bridge rectifier circuit and the filter capacitor, and is under control by the control unit to perform voltage conversion on the received input voltage to generate the DC output voltage.

The disclosure also provides a discharge method of a power supply apparatus, which power supply apparatus includes a power conversion circuit and an AC safety capacitor. The power conversion circuit receives an AC input voltage through an input side, and converts the AC input voltage into a DC output voltage. The AC safety capacitor is connected across the input side of the power conversion circuit. The discharge method includes the following steps. A cross-voltage across two ends of the AC safety capacitor is detected to generate a detection voltage. The detection voltage is compared with a threshold voltage. The number of cycles of the detection voltage during a period when the detection voltage does not cross the threshold voltage is counted according to a comparison result between the detection voltage and the threshold voltage. A discharge operation is performed when the number of cycles is greater than or equal to a predetermined value to discharge electric energy stored in the AC safety capacitor.

In an embodiment of the disclosure, the threshold voltage is set according to a peak voltage of the detection voltage.

In an embodiment of the disclosure, a peak voltage of the detection voltage and the threshold voltage have a predetermined ratio therebetween. The discharge method includes the following. The threshold voltage is set according to the peak voltage of the detection voltage and the predetermined ratio.

In an embodiment of the disclosure, the threshold voltage corresponding to an $N+1^{th}$ cycle of the detection voltage is set according to a peak voltage of an $N^{th}$ cycle of the detection voltage, where N is a positive integer.

Based on the foregoing, according to the embodiments of the disclosure, the control unit detects the cross-voltage across both ends of the AC safety capacitor to generate the detection voltage, compares the detection voltage with the threshold voltage, counts the number of cycles of the detection voltage during the period when the detection voltage does not cross the threshold voltage according to the comparison result between the detection voltage and the threshold voltage, and performs the discharge operation when the number of cycles is greater than or equal to the predetermined value to discharge the electric energy stored in the AC safety capacitor. As such, when abnormality occurs in the AC input voltage and a sine wave can still be detected at the input terminal of the power supply apparatus, the discharge operation of the AC safety capacitor may be performed, thereby improving the safety of use of the power supply apparatus.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
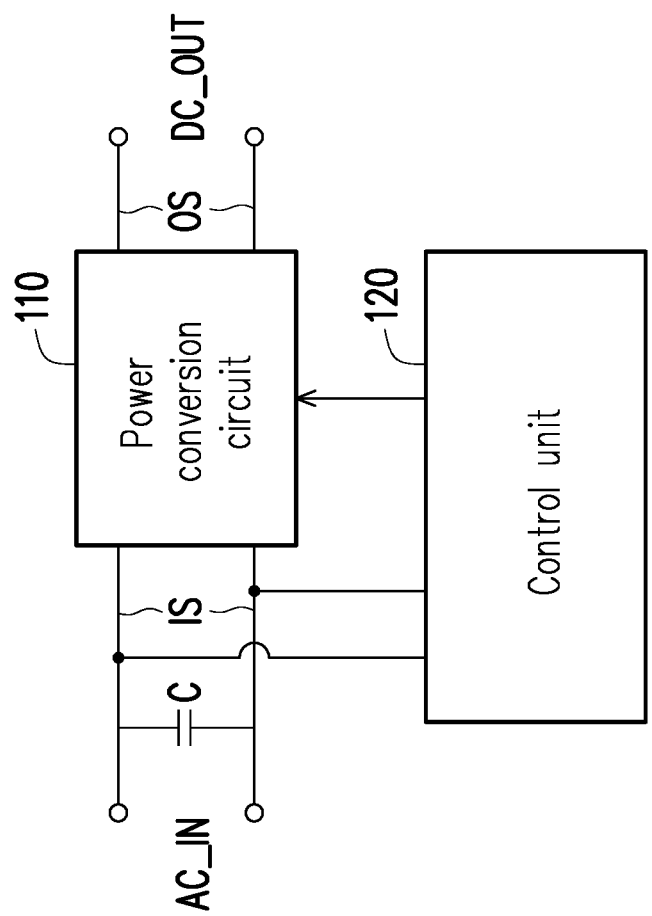
FIG. 1 is a schematic diagram of a power supply apparatus according to an embodiment of the disclosure.

In order to make the disclosure more comprehensible, embodiments are provided hereinafter to serve as examples according to which the disclosure can reliably be carried out. In addition, wherever possible, elements/members/steps referred to by using the same reference numerals in the drawings and embodiments represent the same or similar parts.

FIG. 1 is a schematic circuit diagram of a power supply apparatus according to an embodiment of the disclosure. With reference to FIG. 1, in this embodiment, the power supply apparatus is an AC-DC conversion power supply apparatus, and includes a power conversion circuit 110, an AC safety capacitor C, and a control unit 120. The AC safety capacitor C is connected across two ends of an input side IS. The control unit 120 is coupled to the power conversion circuit 110 and the AC safety capacitor C. The power conversion circuit 110 receives an AC input voltage AC_IN (for example, but not limited to, mains power, i.e., a sine wave with a frequency of 60 Hz,) through the input side IS, and converts the AC input voltage AC_IN into a DC output voltage DC_OUT and outputs the same to a load terminal through an output side OS. In this embodiment, the power conversion circuit 110 may be a full-bridge power converter, and may include a full-bridge rectifier configured for full-bridge rectification, and a filter capacitor configured to filter an output of the full-bridge rectifier. In other embodiments, power converters in other forms, such as a half-bridge power converter, a forward power converter, a flyback power converter, or a push-pull power converter, may also be applicable to the disclosure. The types of the power conversion circuit are not limited by the embodiments of the disclosure.

The AC safety capacitor C is configured to filter/suppress possible noise in the AC input voltage AC_IN. The control unit 120 is, for example, a pulse width modulation (PWM) control chip, and may be configured to control operation of the power conversion circuit 110. In this embodiment, the control unit 120 may detect a cross-voltage across two ends of the AC safety capacitor C to generate a detection voltage, compare the detection voltage with a threshold voltage, determine whether the detection voltage crosses the threshold voltage according to a comparison result between the detection voltage and the threshold voltage, count the number of cycles of the detection voltage during a period when the detection voltage does not cross the threshold voltage when the detection voltage does not cross the threshold voltage, and perform a discharge operation when the number of cycles is greater than or equal to a predetermined value to discharge electric energy stored in the AC safety capacitor C. The control unit 120 may set the threshold voltage according to a peak voltage of the detection voltage. For example, the peak voltage of the detection voltage and the threshold voltage may have a predetermined ratio therebetween, and the control unit 120 may set the threshold voltage according to the peak voltage of the detection voltage and the predetermined ratio. For example, the threshold voltage may be set to 20% of the peak voltage of the detection voltage under normal operation of the AC input voltage AC_IN, but it is not limited thereto. In other embodiments, the threshold voltage may also be set to 30% or other proportions of the peak voltage of the detection voltage depending on the application. Under normal operation of the AC input voltage AC_IN, the detection voltage continuously crosses the threshold voltage, and when the AC input voltage AC_IN is removed or abnormality occurs therein (e.g., when one end of the input side IS is floating), an amplitude of the detection voltage disappears or is reduced, such that the cross between the detection voltage and the threshold voltage disappears. Therefore, by determining whether to perform the discharge operation according to whether the detection voltage crosses the threshold voltage, even when abnormality occurs in the AC input voltage AC_IN but a sine wave can still be detected at the input terminal of the power supply apparatus, the control unit 120 may still automatically perform the discharge operation, improving the safety of use of the power supply apparatus.

Figure 2:
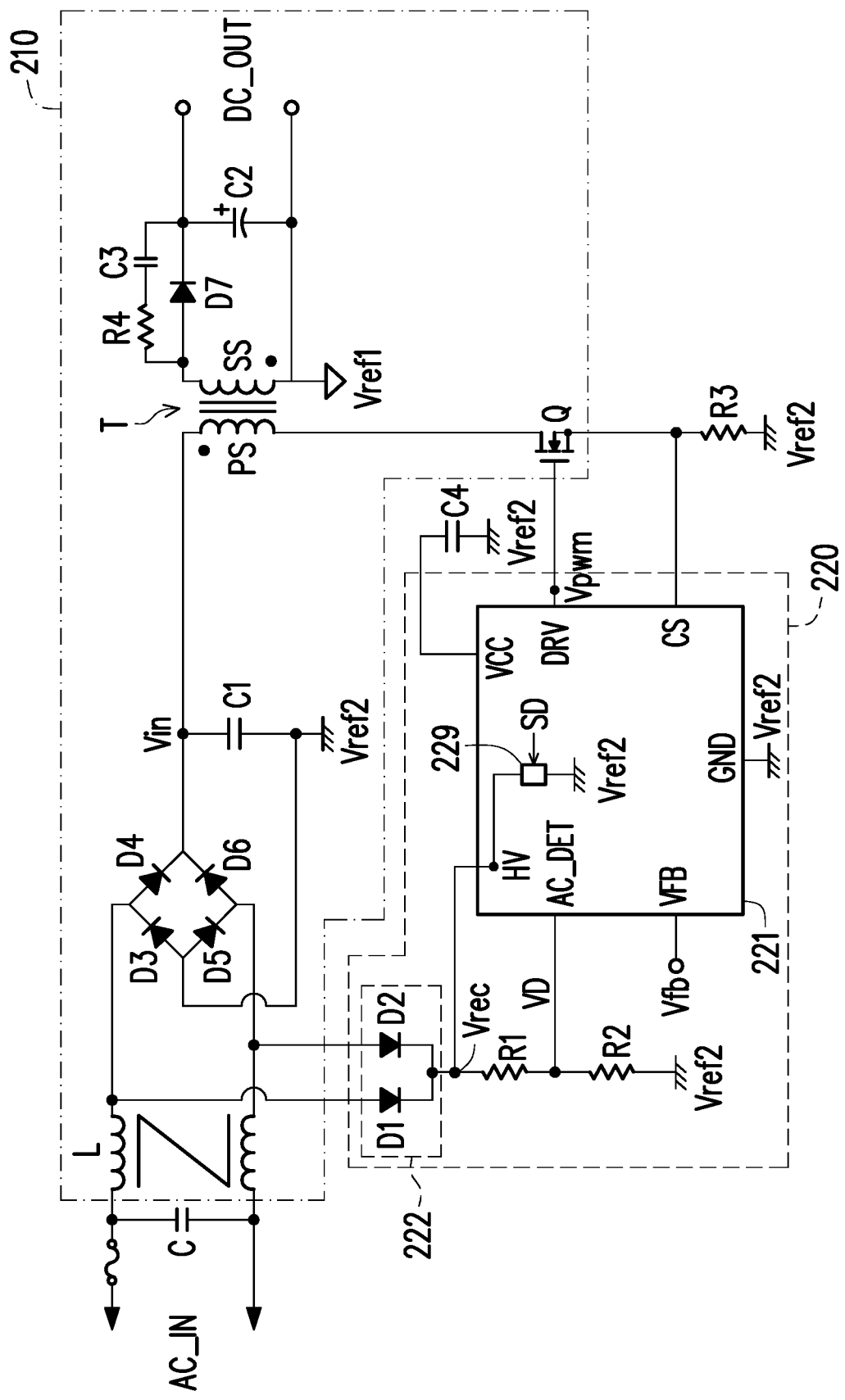
FIG. 2 is a circuit diagram of a power supply apparatus according to an embodiment of the disclosure.

FIG. 2 is a schematic diagram of a power supply apparatus according to another embodiment of the disclosure. With reference to FIG. 2, the power supply apparatus includes a power conversion circuit 210, the AC safety capacitor C, and a control unit 220. In this embodiment, the power conversion circuit 210 includes a choke L (composed of diodes D3 to D6, for example), a full-bridge rectifier circuit, a filter capacitor C1, and a voltage conversion circuit (composed of a power switch Q, a transformer T, a diode D7, capacitors C2 and C3, and a resistor R4, for example).

The choke L has, for example, two common-mode coils. The two common-mode coils are coupled to both ends of the AC safety capacitor C and receive the AC input voltage AC_IN. The choke L may be configured to filter power noise input to the power conversion circuit 210.

The full-bridge rectifier circuit composed of the diodes D3 to D6 is coupled to the choke L. A cathode of the diode D3 and an anode of the diode D4 are jointly coupled to one of the common-mode coils of the choke L, and a cathode of the diode D5 and an anode of the diode D6 are jointly coupled to the other common-mode coil of the choke L. The full-bridge rectifier circuit is configured to receive the AC input voltage AC_IN with noise suppressed, and perform full-bridge rectification on the same to generate an input voltage Vin. A first terminal of the filter capacitor C1 is coupled to cathodes of the diodes D4 and D6, and a second terminal of the filter capacitor C1 is coupled to a second ground terminal Vref2. The filter capacitor C1 is configured to filter the input voltage Vin generated by the full-bridge rectifier circuit.

In the voltage conversion circuit, the transformer T has a primary side PS and a secondary side SS. A common-polarity terminal (dotted terminal) of the primary side PS of the transformer T is coupled to the first terminal of the filter capacitor C1 to receive the input voltage Vin. The power switch Q is, for example, an N-type transistor, of which a first terminal (drain terminal) is coupled to an opposite-polarity terminal (non-dotted terminal) of the primary side PS of the transformer T, and the power switch Q is switched under control by a driving signal Vpwm generated by the control unit 220. An anode of the diode D7 is coupled to an opposite-polarity terminal of the secondary side SS of the transformer T. In addition, a first terminal of the capacitor C2 is coupled to a cathode of the diode D7, and a second terminal of the capacitor C2 and a common-polarity terminal of the secondary side SS of the transformer T are jointly coupled to a first ground terminal Vref1. The resistor R4 and the capacitor C3 are connected in series and connected across two ends of diode D7. Therefore, in response to switching of the power switch Q and a turn ratio between coils on the primary side PS and the secondary side SS, the transformer T induces an induction voltage related to the input voltage Vin on the secondary side SS. The induction voltage is then converted into the DC output voltage DC_OUT through operations of the diode D7, the resistor R4, and the capacitors C2 and C3. In other words, in response to the driving signal Vpwm, the voltage conversion circuit may perform voltage conversion on an output of the filter capacitor C1 and convert the same into the DC output voltage DC_OUT.

As for the control unit 220, in this embodiment, it may include a control chip 221 and a rectifier circuit 222. The rectifier circuit 222 is coupled to the power conversion circuit 210 and the AC safety capacitor C, and rectifies the AC input voltage AC_IN to generate a rectified voltage Vrec. In this embodiment, the rectifier circuit 222 may be a half-wave rectifier circuit composed of diodes D1 and D2. Anodes of the diodes D1 and D2 are configured to receive the AC input voltage AC_IN, and cathodes of the diodes D1 and D2 are configured to provide the rectified voltage Vrec.

The control chip 221 has multiple pins, such as a power pin VCC, a ground pin GND, a high-voltage pin HV, an output pin DRV, a feedback pin VFB, a current detection pin CS, and an AC power detection pin AC_DET, to receive or output signals. The control chip 221 may receive a required operating voltage through the power pin VCC, and be coupled to the second ground terminal Vref2 through the ground pin GND, such that the control chip 221 operates normally, and adjusts the received operating voltage to generate working voltages required by each functional circuit in the control chip 221. In this embodiment, the control chip 221 may receive the rectified voltage Vrec related to the AC input voltage AC_IN through the high-voltage pin HV, and adjust the rectified voltage Vrec as its operating voltage through the internal circuit of the control chip 221. In other embodiments, the control chip 221 may also receive an external DC input voltage as its operating voltage. A bypass capacitor C4 is coupled between the power pin VCC of the control chip 221 and the second ground terminal Vref2, and is configured to reduce the power noise input to the control chip 221 to thereby stabilize operation of the control chip 221. The bypass capacitor C4 may be selected and utilized depending on design requirements.

The control unit 220 may generate and output the driving signal Vpwm through the output pin DRV of the control chip 221 to control the switching of the power switch Q, such that the voltage conversion circuit 210 outputs the DC output voltage DC_OUT. The feedback pin VFB of the control chip 221 may be coupled to the secondary side SS of the transformer T through a feedback circuit (not shown). The feedback circuit is configured to receive the DC output voltage DC_OUT and provide a feedback signal Vfb related to a state of the load terminal to the feedback pin VFB of the control chip 221. Notably, where the feedback signal related to the state of the load terminal can be output, a circuit in any form (e.g., a feedback circuit utilizing a resistor divider) may serve as the feedback circuit of this embodiment. Therefore, the implementation aspect of the feedback circuit is not limited by the embodiment herein.

As for the current detection pin CS of the control chip 221, it may detect a current flowing through the power switch Q by utilizing a resistor R3 coupled between a second terminal of the power switch Q and the second ground terminal Vref2. Based on actual design or application requirements, persons applying this embodiment may add other functional pins, such as an over-voltage detection pin or an over-current detection pin, to the control chip 221, or may delete the existing functional pins of the control chip 221. The above is not limited by the disclosure.

In this embodiment, the control unit 200 also includes a voltage-dividing circuit composed of resistors R1 and R2. The voltage-dividing circuit is coupled between the rectifier circuit 222 and the second ground terminal Vref2, and may be configured to provide a detection voltage VD generated after the rectified voltage Vrec is divided to the AC power detection pin AC_DET of the control chip 221. The control chip 221 may determine whether to perform the discharge operation according to whether the detection voltage VD crosses the threshold voltage. In this way, even when abnormality occurs in the AC input voltage AC_IN but a sine wave can still be detected at the input terminal of the power supply apparatus, the control chip 221 may still automatically perform the discharge operation, improving the safety of use of the power supply apparatus.

Figure 3:
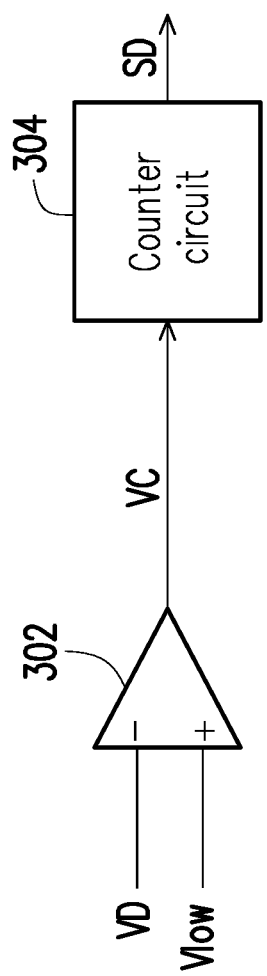
FIG. 3 is a circuit diagram of a control unit according to an embodiment of the disclosure.

In order to more clearly explain the specific structure and operation of the control unit in the embodiment of the disclosure, an example of FIG. 3 to FIG. 5 hereinafter serves for the explanation. FIG. 3 is a circuit diagram showing the control unit 220 according to an embodiment of the disclosure, and FIG. 4 and FIG. 5 are timing diagrams showing operation of the control unit 220 according to the embodiment of the disclosure.

With reference to FIG. 3 first, the control unit 220 may include a comparator circuit 302 and a counter circuit 304. A positive input terminal of the comparator circuit 302 receives a threshold voltage Vlow, a negative input terminal receives the detection voltage VD through the AC power detection pin AC_DET, and an output terminal of the comparator circuit 302 is coupled to the counter circuit 304. The comparator circuit 302 may compare the detection voltage VD with the threshold voltage Vlow to generate a comparison voltage VC to the counter circuit 304. The counter circuit 304 may count the number of cycles of the detection voltage VD during the period when the detection voltage VD does not cross the threshold voltage Vlow according to the comparison voltage VC to generate a count value, and output a discharge control signal SD according to the count value and the predetermined value.

Figure 4:
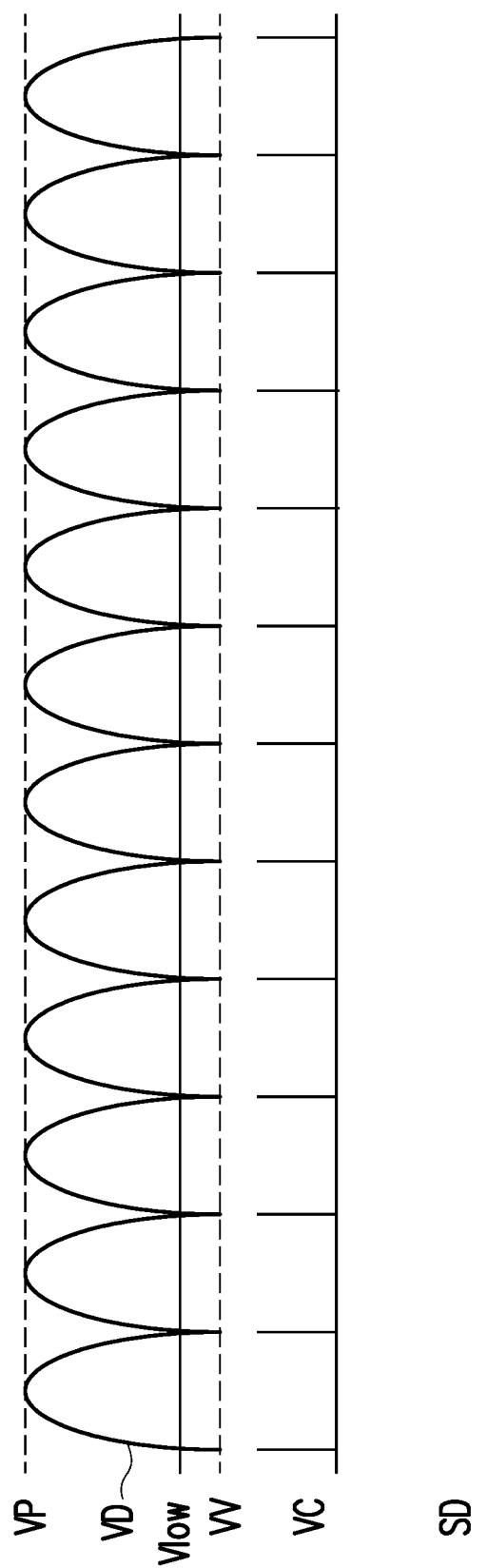
FIG. 4 is a timing diagram of operation of a control unit according to an embodiment of the disclosure.

For example, as shown in FIG. 4, the detection voltage VD has a peak voltage VP and a valley voltage VV. Under normal operation of the AC input voltage AC_IN, the threshold voltage Vlow (the threshold voltage Vlow may, for example, be set to 20% of the peak voltage VP of the detection voltage VD under normal operation of the AC input voltage AC_IN, but it is not limited thereto) periodically crosses the detection voltage VD. Correspondingly, the comparison voltage VC output by the comparator circuit 302 also periodically changes its voltage level. According to the comparison voltage VC, the counter circuit 304 may determine that it is not required to perform a discharge operation at this time, and as a result, the discharge control signal SD is maintained at a low voltage level.

Figure 5:
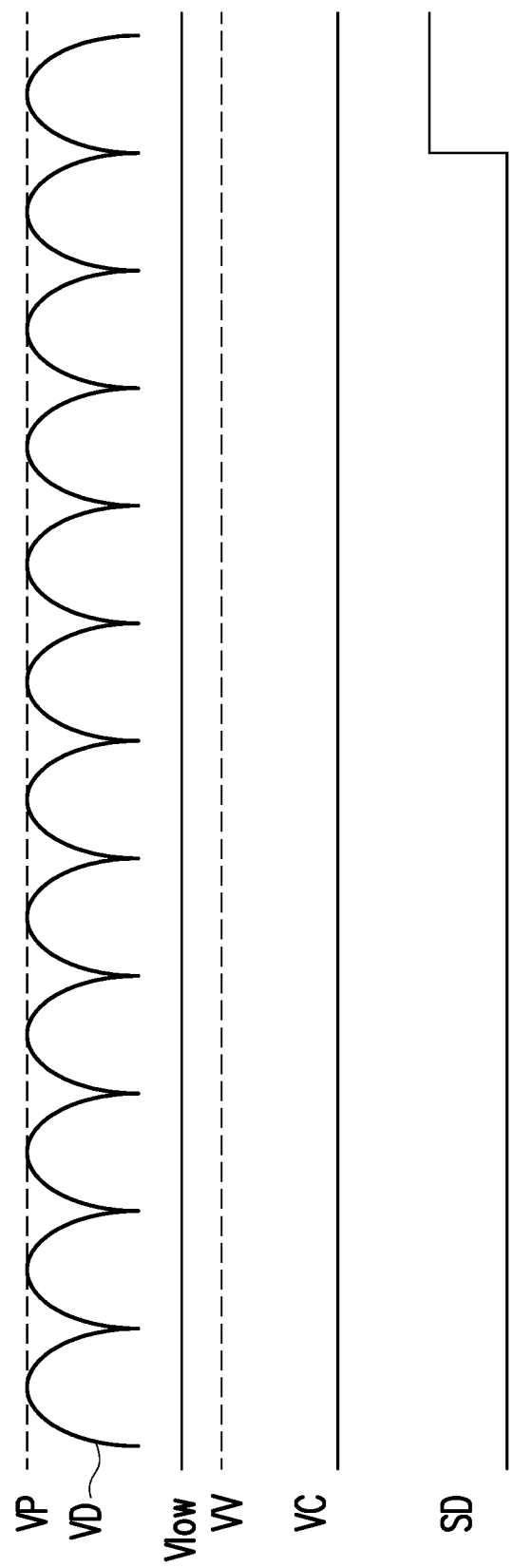
FIG. 5 is a timing diagram of operation of the control unit according to an embodiment of the disclosure.

In addition, as shown in FIG. 5, in the case of abnormality in the AC input voltage AC_IN, in response to the change of the AC input voltage AC_IN, an amplitude of the detection voltage VD is reduced. At this time, the threshold voltage Vlow is continuously lower than the detection voltage VD. Therefore, the threshold voltage Vlow no longer crosses the detection voltage VD, and the comparison voltage VC output by the comparator circuit 302 is also continuously maintained at a low voltage level. According to the comparison voltage VC, the counter circuit 304 may start counting the detection voltage VD after a first cycle of the detection voltage VD ends. As shown in FIG. 5, assuming that the predetermined value is 10, since the comparison voltage VC is continuously at a low voltage level, the counter circuit 304 continuously counts the number of cycles of the detection voltage VD, and outputs the discharge control signal SD at a high-voltage level after counting 10 cycles of the detection voltage VD to perform the discharge operation.

Notably, in some embodiments, the control unit 220 may also set the threshold voltage Vlow corresponding to an $N+1^{th}$ cycle of the detection voltage VD according to a peak voltage VP of an $N^{th}$ cycle of the detection voltage VD, where N is a positive integer. For example, the threshold voltage Vlow of the $N+1^{th}$ cycle of the detection voltage VD may be set to 20% of the peak voltage VP of the $N^{th}$ cycle of the detection voltage VD, but it is not limited thereto. In other words, the threshold voltage Vlow may vary with the peak voltage VP of the previous cycle of the detection voltage VD, and is not limited to 20% of the peak voltage VP under normal operation of the AC input voltage AC_IN.

For the description of a discharge circuit, reference may be made back to FIG. 2. According to whether the discharge control signal SD is enabled (e.g., at a high voltage level) or disabled (e.g., at a low voltage level), a discharge circuit 229 may correspondingly determine whether to turn on a discharge path between the AC safety capacitor C and the second ground terminal Vref2, so as to discharge the electric energy stored in the AC safety capacitor C. The discharge path may be realized by a controllable load (e.g., a combination circuit formed by a switch and a resistor connected in series) coupled between the high-voltage pin HV and the second ground terminal Vref2, but the disclosure is not limited thereto. In another embodiment, the discharge circuit 229 may also be realized through a voltage-controlled current source. The circuit realization of the controllable load and the way to discharge the electrical energy stored in the AC safety capacitor C is not limited by the disclosure.

Figure 6:
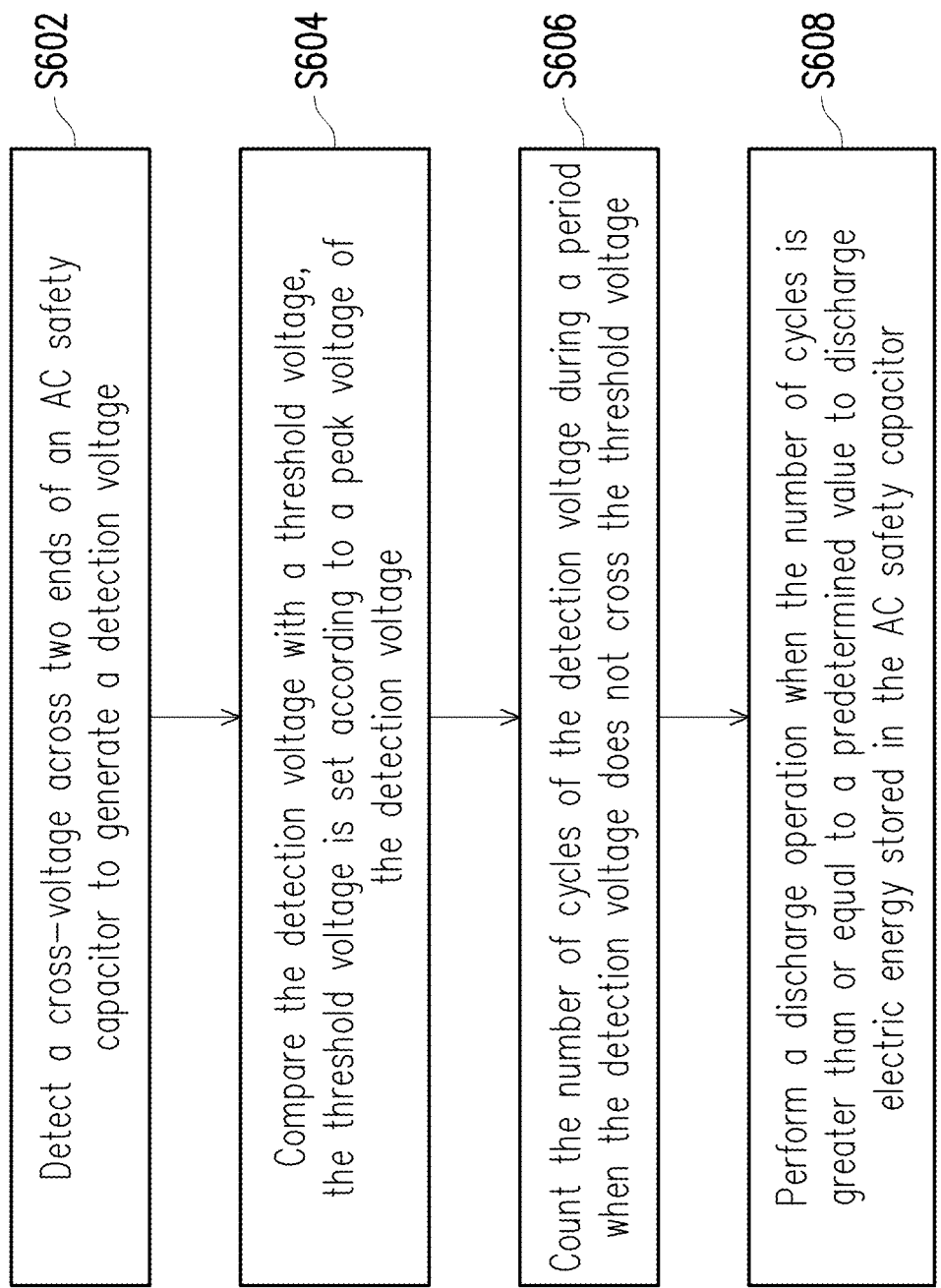
FIG. 6 is a flowchart of a discharge method of a power supply apparatus according to an embodiment of the disclosure.
Figure 7:
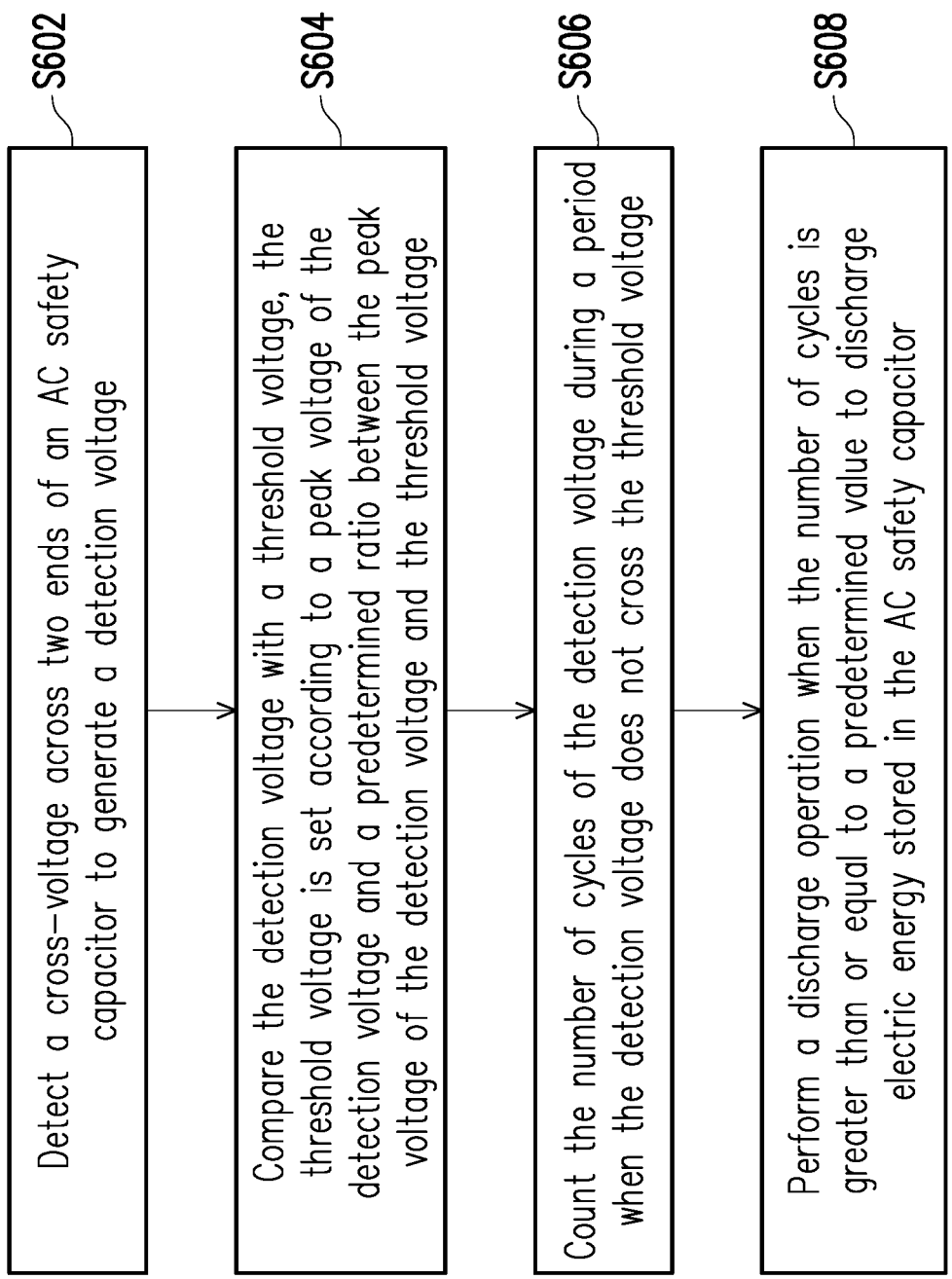
FIGS. 7 and 8 are flowcharts of discharge methods of a power supply apparatus according to embodiments of the disclosure.
Figure 8:
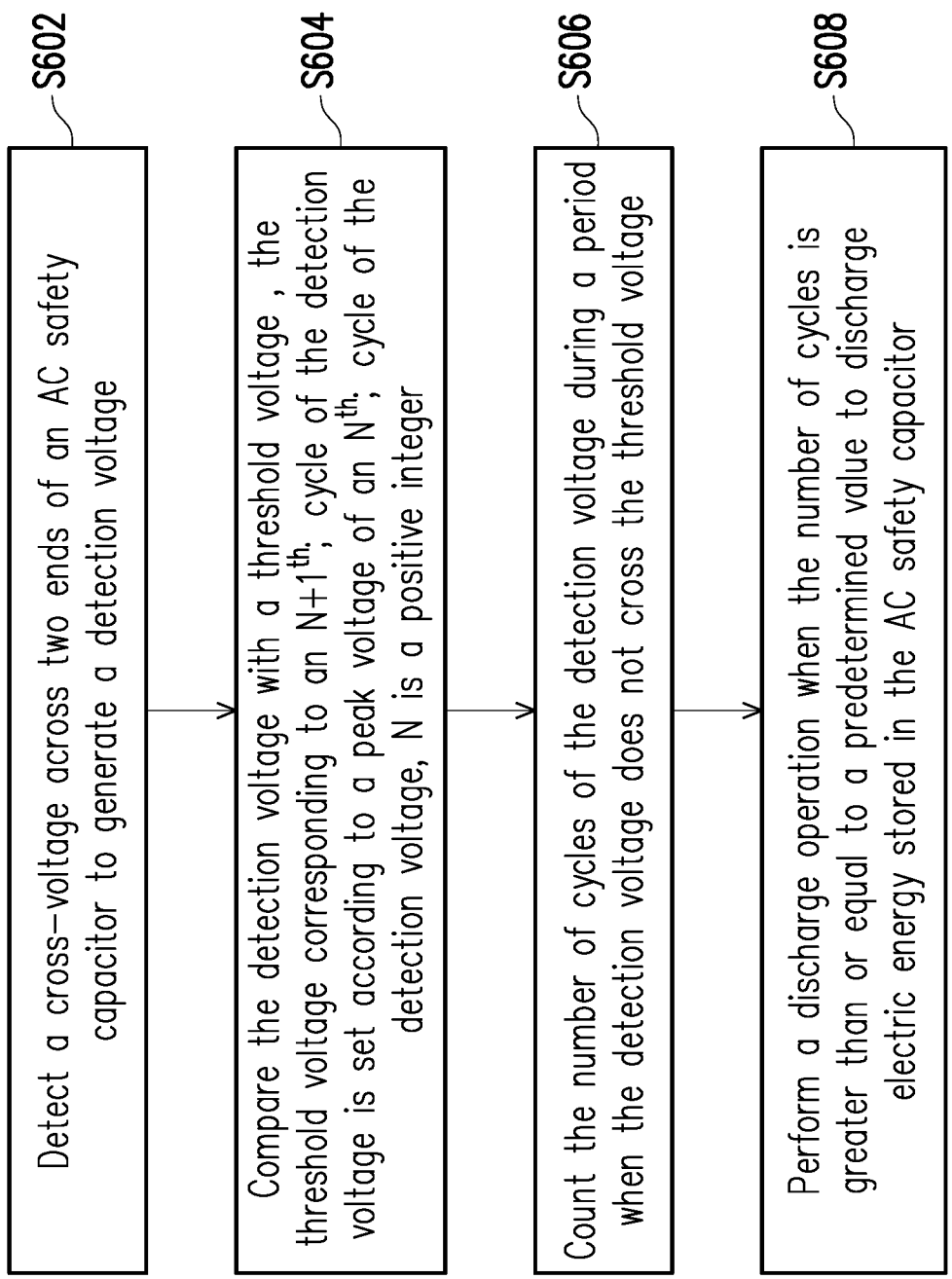

FIGS. 6-8 are flowcharts of discharge methods of a power supply apparatus according to an embodiments of the disclosure. According to the above embodiments, the discharge method of a power supply apparatus may include at least the following steps. First, a cross-voltage across two ends of an AC safety capacitor is detected to generate a detection voltage (step S602). Then, the detection voltage is compared with a threshold voltage (step S604) to determine whether the detection voltage crosses the threshold voltage according to a comparison result between the detection voltage and the threshold voltage. The threshold voltage may be set according to a peak voltage of the detection voltage (as shown in step S604 of FIG. 6). For example, the peak voltage of the detection voltage and the threshold voltage may have a predetermined ratio therebetween. The threshold voltage may be set according to the peak voltage of the detection voltage and the predetermined ratio (as shown in step S604 of FIG. 7). For example, the threshold voltage is set to 20% of the peak voltage of the detection voltage, but it is not limited thereto. In some embodiments, the threshold voltage corresponding to an $N+1^{th}$ cycle of the detection voltage may be set according to a peak voltage of an $N^{th}$ cycle of the detection voltage (as shown in step S604 of FIG. 8). After that, the number of cycles of the detection voltage during a period when the detection voltage does not cross the threshold voltage is counted according to the comparison result between the detection voltage and the threshold voltage (step S606). Moreover, a discharge operation is performed when the number of cycles is greater than or equal to a predetermined value to discharge electric energy stored in the AC safety capacitor (step S608).

In summary of the foregoing, according to the embodiments of the disclosure, the control unit detects the cross-voltage across both ends of the AC safety capacitor to generate the detection voltage, compares the detection voltage with the threshold voltage, counts the number of cycles of the detection voltage during the period when the detection voltage does not cross the threshold voltage according to the comparison result between the detection voltage and the threshold voltage, and performs the discharge operation when the number of cycles is greater than or equal to the predetermined value to discharge the electric energy stored in the AC safety capacitor. As such, when abnormality occurs in the AC input voltage and a sine wave can still be detected at the input terminal of the power supply apparatus, the discharge operation of the AC safety capacitor may be performed, thereby improving the safety of use of the power supply apparatus.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A power supply apparatus, comprising:
    a power conversion circuit receiving an AC input voltage through an input side, and converting the AC input voltage into a DC output voltage;
    an AC safety capacitor connected across the input side; and
    a control unit coupled to the power conversion circuit and the AC safety capacitor, and controlling operation of the power conversion circuit, wherein the control unit detects a cross-voltage across two ends of the AC safety capacitor to generate a detection voltage, compares the detection voltage with a threshold voltage, counts the number of cycles of the detection voltage during a period when the detection voltage does not cross the threshold voltage according to a comparison result between the detection voltage and the threshold voltage when the detection voltage is still a sine wave, and performs a discharge operation when the number of cycles is greater than or equal to a predetermined value to discharge electric energy stored in the AC safety capacitor.

2. The power supply apparatus according to claim 1, wherein the control unit sets the threshold voltage according to a peak voltage of the detection voltage.

3. The power supply apparatus according to claim 1, wherein a peak voltage of the detection voltage and the threshold voltage have a predetermined ratio therebetween, and the control unit sets the threshold voltage according to the peak voltage of the detection voltage and the predetermined ratio.

4. The power supply apparatus according to claim 1, wherein the control unit sets the threshold voltage corresponding to an N+1th cycle of the detection voltage according to a peak voltage of an Nth cycle of the detection voltage, where N is a positive integer.

5. The power supply apparatus according to claim 1, wherein the control unit comprises:
    a rectifier circuit coupled to the power conversion circuit and the AC safety capacitor, and rectifying the AC input voltage to generate a rectified voltage;
    a voltage-dividing circuit coupled to the rectifier circuit, and dividing the rectified voltage to generate the detection voltage;
    a comparator circuit, wherein positive and negative input terminals of the comparator circuit respectively receive the threshold voltage and the detection voltage, and the comparator circuit outputs a comparison voltage according to the detection voltage and the threshold voltage; and
    a counter circuit coupled to an output terminal of the comparator circuit, counting the number of cycles of the detection voltage during the period when the detection voltage does not cross the threshold voltage according to the comparison voltage to generate a count value, and outputting a discharge control signal according to the count value and the predetermined value.

6. The power supply apparatus according to claim 1, wherein the control unit comprises:
    a discharge circuit under control by a discharge control signal to provide a discharge path between the AC safety capacitor and a ground terminal to discharge the electric energy stored in the AC safety capacitor to the ground terminal.

7. The power supply apparatus according to claim 6, wherein the discharge circuit comprises a controllable load or a voltage-controlled current source.

8. The power supply apparatus according to claim 1, wherein the power conversion circuit comprises:
    a choke coupled to the AC safety capacitor, receiving the AC input voltage, and being configured to filter power noise in the AC input voltage;
    a full-bridge rectifier circuit coupled to the choke, and performing full-bridge rectification on the AC input voltage filtered by the choke to generate an input voltage;
    a filter capacitor coupled to the full-bridge rectifier circuit, and being configured to filter the input voltage; and
    a voltage conversion circuit coupled to the full-bridge rectifier circuit and the filter capacitor, and being under control by the control unit to perform voltage conversion on the received input voltage to generate the DC output voltage.

9. A discharge method of a power supply apparatus, wherein the power supply apparatus comprises a power conversion circuit and an AC safety capacitor, the power conversion circuit receives an AC input voltage through an input side, and converts the AC input voltage into a DC output voltage, the AC safety capacitor is connected across the input side of the power conversion circuit, and the discharge method comprises:
    detecting a cross-voltage across two ends of the AC safety capacitor to generate a detection voltage;
    comparing the detection voltage with a threshold voltage;
    counting the number of cycles of the detection voltage during a period when the detection voltage does not cross the threshold voltage according to a comparison result between the detection voltage and the threshold voltage when the detection voltage is still a sine wave; and
    performing a discharge operation when the number of cycles is greater than or equal to a predetermined value to discharge electric energy stored in the AC safety capacitor.

10. The discharge method according to claim 9, wherein the threshold voltage is set according to a peak voltage of the detection voltage.

11. The discharge method according to claim 9, wherein a peak voltage of the detection voltage and the threshold voltage have a predetermined ratio therebetween, and the discharge method comprises:

setting the threshold voltage according to the peak voltage of the detection voltage and the predetermined ratio.

12. The discharge method according to claim 9, wherein the threshold voltage corresponding to an N+1th cycle of the detection voltage is set according to a peak voltage of an Nth cycle of the detection voltage, where N is a positive integer.

* * * * *